US012562417B2

(12) United States Patent
Li et al.

(10) Patent No.: US 12,562,417 B2
(45) Date of Patent: Feb. 24, 2026

(54) BATTERY CELL AND BATTERY CONTAINING SUCH BATTERY CELL

(71) Applicant: NINGDE AMPEREX TECHNOLOGY LIMITED, Ningde City (CN)

(72) Inventors: Xuecheng Li, Ningde (CN); Junhui Hou, Ningde (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 405 days.

(21) Appl. No.: 17/956,687

(22) Filed: Sep. 29, 2022

(65) Prior Publication Data

US 2023/0017239 A1 Jan. 19, 2023

Related U.S. Application Data

(63) Continuation of application No. PCT/CN2020/082113, filed on Mar. 30, 2020.

(51) Int. Cl.
*H01M 50/105* (2021.01)
*H01M 50/14* (2021.01)
*H01M 50/584* (2021.01)

(52) U.S. Cl.
CPC ......... *H01M 50/105* (2021.01); *H01M 50/14* (2021.01); *H01M 50/584* (2021.01)

(58) Field of Classification Search
CPC ... H01M 50/105; H01M 50/584; H01M 50/14
See application file for complete search history.

(56) References Cited

U.S. PATENT DOCUMENTS

2018/0145376 A1* 5/2018 Jo ........................ H01M 50/461
2018/0342761 A1* 11/2018 Eaglesham ....... H01M 10/0459
(Continued)

FOREIGN PATENT DOCUMENTS

CN 202205852 U 4/2012
CN 203690420 U 7/2014
(Continued)

OTHER PUBLICATIONS

English Translation of Wu et al. CN-202205852-U (Year: 2012).*
Ningde Amperex Technology Ltd., International Search Report and Written Opinion, PCT/CN2020/082113, Nov. 27, 2020, 13 pgs.

*Primary Examiner* — Brian R Ohara
*Assistant Examiner* — Emily Elizabeth Freeman
(74) *Attorney, Agent, or Firm* — XSENSUS LLP

(57) ABSTRACT

A battery cell includes an electrode assembly and a packaging bag for accommodating the electrode assembly and a first adhesive layer and a second adhesive layer. One end of the first adhesive layer and one end of the second adhesive layer are both adhered to the first surface of the electrode assembly, and the other end of the first adhesive layer and the other end of the second adhesive layer both extend to the bottom of the electrode assembly and are adhered to a second surface opposite the first surface, a surface on which a terminating end of the electrode assembly is defined as the first surface; and a third adhesive layer, one end of the third adhesive layer is adhered to the first adhesive layer, and the other end of the third adhesive layer is adhered to the second adhesive layer.

11 Claims, 2 Drawing Sheets

(56) References Cited

U.S. PATENT DOCUMENTS

2020/0343499 A1 * 10/2020 Yoo ..................... H01M 10/655
2021/0218093 A1 * 7/2021 Wang ................ H01M 10/0525

FOREIGN PATENT DOCUMENTS

| CN | 204289549 U | 4/2015 |
| CN | 107615549 A | 1/2018 |
| CN | 209401661 U | 9/2019 |
| CN | 210156440 U | 3/2020 |
| KR | 20180106512 A | * 10/2018 |
| WO | WO 2019169546 A1 | 9/2019 |

* cited by examiner

100

11    122    121    115

113    112

114

40    30    115

BATTERY CELL AND BATTERY CONTAINING SUCH BATTERY CELL

CROSS-REFERENCE TO RELATED APPLICATIONS

This application is a continuation application of PCT Patent Application No. PCT/CN2020/082113, entitled "CELL AND BATTERY HAVING SAID CELL" filed on Mar. 30, 2020, which is incorporated herein by reference in its entirety.

TECHNICAL FIELD

This application relates to the battery field, and in particular, to a battery cell and a battery containing such battery cell.

BACKGROUND

At present, most commercially available electronic devices are powered by their built-in batteries. Now, battery cells in the marketplace all use packaging bags to accommodate electrode assemblies, and then are put into housings to form batteries for use. Falling is inevitable during use of an electronic device. During a fall, there may be relative movement between an electrode assembly and a packaging bag, resulting in a shear force between them to cause the electrode assembly to separate from the packaging bag, which in turn causes safety problems such as top seal being pushed open and battery being short-circuited, and eventually leads to battery failure.

SUMMARY

In view of the foregoing issues, it is necessary to provide a battery cell and a battery containing such battery cell to reduce failure caused by falling.

An embodiment of this application provides a battery cell, including an electrode assembly and a packaging bag for accommodating the electrode assembly, where the battery cell further includes:

a first adhesive layer and a second adhesive layer, where one end of the first adhesive layer and one end of the second adhesive layer are both adhered to a first surface of the electrode assembly, and the other end of the first adhesive layer and the other end of the second adhesive layer both extend to the bottom of the electrode assembly and are adhered to a second surface opposite the first surface, where a surface on which a terminating end of the electrode assembly is located is defined as the first surface; and a third adhesive layer, bonding the packaging bag and the electrode assembly together, where one end of the third adhesive layer is adhered to the first adhesive layer located on the first surface, and the other end of the third adhesive layer is adhered to the second adhesive layer located on the first surface.

According to some embodiments of this application, the first adhesive layer or the second adhesive layer is a single-sided adhesive, and the third adhesive layer is a double-sided adhesive.

According to some embodiments of this application, a width of the first adhesive layer or the second adhesive layer located on the first surface ranges from 10 mm to 20 mm.

According to some embodiments of this application, a difference between a length of the first adhesive layer or the second adhesive layer located on the first surface and a distance from the top of the third adhesive layer to the bottom of the electrode assembly is greater than or equal to 2 mm.

According to some embodiments of this application, a length difference between the electrode assembly and the first adhesive layer or the second adhesive layer located on the first surface is greater than or equal to 10 mm.

According to some embodiments of this application, a width of the first adhesive layer or the second adhesive layer located on the second surface ranges from 10 mm to 20 mm.

According to some embodiments of this application, a length of the first adhesive layer or the second adhesive layer located on the second surface ranges from 10 mm to 40 mm.

According to some embodiments of this application, a spacing between a first side of the third adhesive layer and the outermost side of the first adhesive layer away from the first side is greater than 5 mm, or a spacing between a second side of the third adhesive layer and the outermost side of the second adhesive layer away from the second side is greater than 5 mm, and the first side is opposite the second side.

According to some embodiments of this application, bonding force between the first adhesive layer or the second adhesive layer and the electrode assembly is greater than bonding force between the third adhesive layer and the first adhesive layer or the second adhesive layer.

An embodiment of this application further provides a battery, including a housing and the foregoing battery cell, where the housing is configured to accommodate the battery cell.

In the foregoing battery cell and the battery containing such battery cell, the first adhesive layer and the second adhesive layer are adhered to a first surface of the electrode assembly, and the other end of the first adhesive layer and the other end of the second adhesive layer extend to a second surface opposite the first surface, and two ends of the third adhesive layer are respectively bonded to the first adhesive layer and the second adhesive layer on the first surface, so that a shear force caused by the packaging bag on the electrode assembly during falling is finally transferred to the first adhesive layer, the second adhesive layer, and the packaging bag. This helps address the problem that the electrode assembly separates from the packaging bag during falling of the battery cell, and further resolves the resulting safety failures such as top seal being pushed open and short circuits.

REFERENCE SIGNS OF MAIN COMPONENTS

Figure 1:
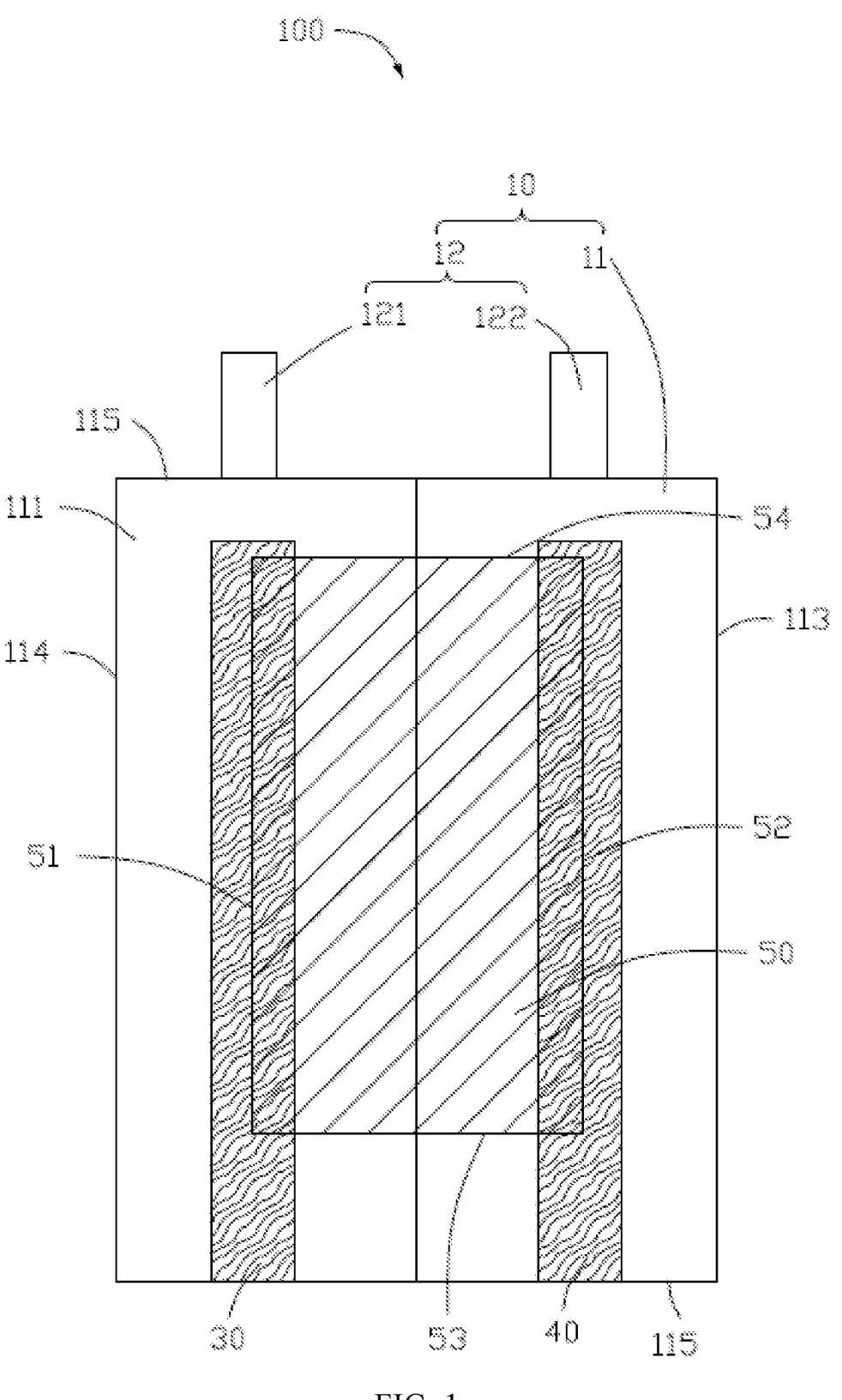
FIG. 1 is a main view of an electrode assembly according to an embodiment of this application.

Battery cell 100
Electrode assembly 10
Electrode assembly body 11
First surface 111
Second surface 112
Third surface 113
Fourth surface 114
End surface 115
Tab 12
Positive tab 121
Negative tab 122

First adhesive layer 30
Second adhesive layer 40
Third adhesive layer 50
First side 51
Second side 52
Third side 53
Fourth side 54

DETAILED DESCRIPTION

The following clearly describes the technical solutions in the embodiments of this application with reference to the accompanying drawings in the embodiments of this application. Apparently, the described embodiments are only some rather than all of the embodiments of this application. All other examples obtained by a person of ordinary skill in the art based on the examples of this application without creative efforts shall fall within the protection scope of this application.

It should be noted that when a component is referred to as being "fastened to" another component, it may be directly fastened to the another component, or there may be a component in between. When a component is deemed as being "connected to" another component, it may be directly connected to the another component, or there may be a component in between. When a component is deemed as being "provided on" another component, it may be directly provided on the another component, or there may be a component in between. The terms "vertical", "horizontal", "left", "right", and other similar expressions as used herein are for illustration only.

Unless otherwise defined, all technical and scientific terms used herein shall have the same meanings as commonly understood by those skilled in the art to which this application belongs. The terms used herein in the specification of this application are merely intended to describe specific embodiments but not intended to limit this application. The term "and/or" used herein includes any and all combinations of one or more related listed items.

This application provides a battery cell, including an electrode assembly and a packaging bag for accommodating the electrode assembly, and the battery cell further includes a first adhesive layer and a second adhesive layer, where one end of the first adhesive layer and one end of the second adhesive layer are both adhered to a first surface of the electrode assembly, and the other end of the first adhesive layer and the other end of the second adhesive layer both extend to the bottom of the electrode assembly and adhered to a second surface opposite the first surface, where a surface on which a terminating end of the electrode assembly is located is defined as the first surface; and a third adhesive layer, bonding the packaging bag and the electrode assembly together, where one end of the third adhesive layer is adhered to the first adhesive layer located on the first surface, and the other end of the third adhesive layer is adhered to the second adhesive layer located on the first surface.

Figure 2:
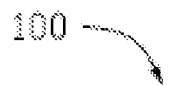
FIG. 2 is a rear view of the electrode assembly shown in FIG. 1.

Referring to FIG. 1 and FIG. 2, an embodiment of this application provides a battery cell 100. The battery cell 100 includes an electrode assembly 10, a packaging bag, a first adhesive layer 30, a second adhesive layer 40, and a third adhesive layer 50. The electrode assembly 10 is accommodated in the packaging bag. The first adhesive layer 30 and the second adhesive layer 40 are adhered to the surface of the electrode assembly 10, each having one end extending to the bottom of the electrode assembly 10 and bonded to another surface of the electrode assembly 10. One side of the third adhesive layer 50 is adhered to the packaging bag, and two ends of the other side of the third adhesive layer 50 are respectively adhered to the first adhesive layer 30 and the second adhesive layer 40. The third adhesive layer bonds the packaging bag and the electrode assembly 10 together.

Specifically, the electrode assembly 10 includes an electrode assembly body 11 and tabs 12 disposed on the electrode assembly body 11.

The outermost surface of the electrode assembly body 11 includes a first surface 111, a second surface 112 opposite the first surface 111, a third surface 113 joined to the first surface 111 and the second surface 112, and a fourth surface 114 opposite the third surface 113. The first surface 111 is a surface on which a terminating end of the electrode assembly 10 is located.

In one embodiment, the outermost surface of the electrode assembly body 11 is made of aluminum foil. To be specific, the electrode assembly body 11 is ended with aluminum foil.

The electrode assembly body 11 further includes two end surfaces 115. The two end surfaces 115 are opposite each other and are separately connected to the first surface 111, the second surface 112, the third surface 113, and the fourth surface 114. The tabs 12 are disposed on one of the end surfaces 115.

In one embodiment, the tabs 12 include a positive tab 121 and a negative tab 122, the positive tab 121 may be made of aluminum, and the negative tab 122 may be made of nickel.

One end of the first adhesive layer 30 is adhered to the first surface 111 of the electrode assembly body 11, and the other end of the first adhesive layer 30 extends to an end surface 115 of the electrode assembly body 11 opposite the end surface 115 provided with the tabs 12 and then is adhered to the second surface 112 opposite the first surface 111.

The second adhesive layer 40 and the first adhesive layer 30 are opposite each other and are adhered to the electrode assembly body 11. Similar to the first adhesive layer 30, the second adhesive layer 40 has one end adhered to the first surface 111 of the electrode assembly body 11, and the other end extending to an end surface 115 of the electrode assembly body 11 opposite the end surface 115 provided with the tabs 12 and then adhered to the second surface 112.

Both the first adhesive layer 30 and the second adhesive layer 40 are single-sided adhesives.

In one embodiment, the first adhesive layer 30 and the second adhesive layer 40 are symmetrically attached to the first surface 111, each having the other end extending and symmetrically attached to the second surface 112.

The first adhesive layer 30 and the second adhesive layer 40 cannot be excessively wide. The excessively wide first adhesive layer 30 and second adhesive layer 40 may be adhered to each other or adhered to the third surface 113 and the fourth surface 114. Similarly, the first adhesive layer 30 and the second adhesive layer 40 cannot be excessively narrow. The excessively narrow first adhesive layer 30 and second adhesive layer 40 are unfavorable for bonding to the third adhesive layer 50, resulting in that an end portion of the third adhesive layer 50 is directly bonded to the first surface 111.

In one embodiment, a width of the first adhesive layer 30 or the second adhesive layer 40 located on the first surface 111 ranges from 10 mm to 20 mm, and width of the first adhesive layer 30 or the second adhesive layer 40 located on the second surface 112 also ranges from 10 mm to 20 mm.

Preferably, the width of the first adhesive layer 30 or the second adhesive layer 40 is 15 mm.

The first adhesive layer 30 or the second adhesive layer 40 on the first surface 111 cannot be excessively long. The excessively long first adhesive layer 30 or second adhesive layer 40 may be bonded to the end surface 115 of the electrode assembly body 11 and extend into a sealing area of the tabs 12.

In one embodiment, a length difference between the electrode assembly body 11 and the first adhesive layer 30 or the second adhesive layer 40 located on the first surface 111 is greater than or equal to 10 mm.

Preferably, the length difference between the electrode assembly body 11 and the first adhesive layer 30 or the second adhesive layer 40 located on the first surface 111 is 15 mm.

The first adhesive layer 30 or the second adhesive layer 40 on the second surface 112 cannot be excessively long. The excessively long first adhesive layer 30 or second adhesive layer 40 may be bonded to the end surface 115 of the electrode assembly body 11 and extend into a sealing area of the tabs 12. In addition, the first adhesive layer 30 or the second adhesive layer 40 on the second surface 112 cannot be excessively short. The excessively short first adhesive layer 30 or second adhesive layer 40 may cause the other end of the first adhesive layer 30 or the second adhesive layer 40 unable to be adhered to the second surface 112 after extending from the end surface 115 of the electrode assembly body 11.

In one embodiment, a length of the first adhesive layer 30 or the second adhesive layer 40 located on the second surface 112 ranges from 10 mm to 40 mm.

Preferably, the length of the first adhesive layer 30 or the second adhesive layer 40 located on the second surface 112 is 15 mm.

The third adhesive layer 50 is a double-sided adhesive. The third adhesive layer 50 is bonded to the first surface 111 of the electrode assembly body 11, and one end of the third adhesive layer 50 adhered to a side of the electrode assembly body 11 is adhered to the first adhesive layer 30 located on the first surface 111, the other end of the third adhesive layer 50 is adhered to the second adhesive layer 40 located on the first surface 111, and the rest part is bonded to the first surface 111. The other side of the third adhesive layer 50 is bonded to the packaging bag, so as to accommodate the electrode assembly 10 by using the packaging bag.

In one embodiment, the first adhesive layer 30 and the second adhesive layer 40 use polymer materials as a matrix, and therefore have strong extensibility. During falling, a shear force caused by the packaging bag on the electrode assembly 10 is transferred to the first adhesive layer 30, the second adhesive layer 40, and the packaging bag, alleviating impacts caused by falling. Moreover, the first adhesive layer 30 and the second adhesive layer 40 are adhered to the second surface from the first surface 111 by bypassing the end surfaces 115, protecting the electrode assembly 10 at their adhesive positions.

In one embodiment, the third adhesive layer 50 is a double-sided hot melt adhesive.

The first adhesive layer 30 or the second adhesive layer 40 on the first surface 111 cannot be excessively short. The excessively short first adhesive layer 30 or second adhesive layer 40 is inadequate to form a sufficient bonding area on the first surface 111, resulting in that two ends of the third adhesive layer 50 on the first surface 111 are directly bonded to the upper part of the electrode assembly body 11.

In one embodiment, a difference between length of the first adhesive layer 30 or the second adhesive layer 40 located on the first surface 111 and distance from the top of the third adhesive layer 50 to an end surface 115 of the electrode assembly body 11 away from the tabs 12 is greater than or equal to 2 mm.

Preferably, the difference between the length of the first adhesive layer 30 or the second adhesive layer 40 located on the first surface 111 and the distance from the top of the third adhesive layer 50 to the end surface 115 of the electrode assembly body 11 away from the tabs 12 is 5 mm. To be specific, distance from the top of the third adhesive layer 50 to the top of the first adhesive layer 30 or second adhesive layer 40 is 5 mm.

The third adhesive layer 50 includes a first side 51, a second side 52 opposite the first side 51, a third side 53 joined to the first side 51 and the second side 52, and a fourth side 54 opposite the third side 53. The first side 51 is adhered to the first adhesive layer 30, and the second side 52 is adhered to the second adhesive layer 40.

The third adhesive layer 50 cannot be excessively wide. The excessively wide third adhesive layer 50 may have its two ends bonded to the first surface 111. Similarly, the third adhesive layer 50 cannot be excessively narrow. The excessively narrow third adhesive layer 50 is insufficient to bond the two ends to the first adhesive layer 30 or the second adhesive layer 40, resulting in that the entire third adhesive layer 50 is directly bonded to the electrode assembly body 11.

In one embodiment, a spacing between the first side 51 of the third adhesive layer 50 and the outermost side of the first adhesive layer 30 away from the first side 51 is greater than 5 mm. A spacing between the second side 52 of the third adhesive layer 50 and the outermost side of the second adhesive layer 40 away from the second side 52 is greater than 5 mm.

Preferably, spacings between the two sides of the third adhesive layer 50 and the outermost sides of the first adhesive layer 30 and the second adhesive layer 40 away from the corresponding sides of the third adhesive layer 50 are 7 mm.

In one embodiment, the third adhesive layer 50 is attached to the middle of the first surface 111 of the electrode assembly body 11 in a longitudinal direction.

In one embodiment, bonding force between the first adhesive layer 30 or the second adhesive layer 40 and the electrode assembly body 11 is greater than that between the third adhesive layer 50 and the first adhesive layer 30 or the second adhesive layer 40, to prevent the first adhesive layer 30 or the second adhesive layer 40 from separating from the electrode assembly body 11 during falling, and transfer a shear force caused by falling to the first adhesive layer 30 or the second adhesive layer 40 and the packaging bag.

An embodiment of this application further provides a battery, including a housing and the foregoing battery cell 100, where the housing is configured to accommodate the battery cell 100.

In one embodiment, the housing is bonded to the battery cell 100 through a fourth adhesive layer.

The fourth adhesive layer is a double-sided adhesive.

In one embodiment, the fourth adhesive layer is bonded to the packaging bag outside the second surface 112 of the electrode assembly 10.

Drop tests are performed on batteries obtained according to this application and on conventional batteries not using the design in this application.

Examples: The electrode assembly 10 with a length of 90 mm was packaged, and the first adhesive layer 30 and the second adhesive layer 40 with a width of 12 mm were used for applying adhesive at the bottom. The first adhesive layer

30 and the second adhesive layer 40 on the first surface 111 were both 78 mm long, and the first adhesive layer 30 and the second adhesive layer 40 on the second surface 112 were both 15 mm long. The third adhesive layer 50 with a width of 30 mm and a length of 60 mm was used for applying adhesive on the first surface 111. A spacing between the first side 51 of the third adhesive layer 50 and the outermost side of the first adhesive layer 30 away from the first side 51 was 7 mm, a spacing between the second side 52 of the third adhesive layer 50 and the outermost side of the second adhesive layer 40 away from the second side 52 was 7 mm, and distance between the top of the third adhesive layer 50 and the top of the first adhesive layer 30 or the second adhesive layer 40 was 3 mm. The electrode assembly 10 was packaged in the packaging bag.

Comparative examples: The electrode assembly 10 with a length of 90 mm was packaged by using the first adhesive layer 30 and the second adhesive layer 40 with a width of 12 mm for applying adhesive at the bottom. The first adhesive layer 30 and the second adhesive layer 40 on the first surface 111 and the second surface 112 were both 15 mm long, and the third adhesive layer 50 with a width of 30 mm and a length of 60 mm was used on the first surface 111 for applying adhesive. The third adhesive layer 50 was not bonded to the first adhesive layer 30 and the second adhesive layer 40. The electrode assembly 10 was packaged in the packaging bag.

Batteries in 10 examples and batteries in 10 comparative examples were separately subjected to drop tests at a height of 1.8 m. Test results: All the batteries in the examples were not torn out, while 7 groups of batteries in the comparative examples were torn out; and all the batteries in the examples had no top seal being pushed open, while 5 groups of batteries in the comparative examples had top seal being pushed open.

In the foregoing battery cell 100 and the battery containing such battery cell 100, the first adhesive layer 30 and the second adhesive layer 40 are adhered to the first surface 111 of the electrode assembly 10, each having the other end extending to the second surface 112 opposite the first surface 111, and two ends of the third adhesive layer 50 are respectively bonded to the first adhesive layer 30 and the second adhesive layer 40 on the first surface 111, so that a shear force caused by the packaging bag on the electrode assembly 10 during falling is transferred to the first adhesive layer 30, the second adhesive layer 40 and the packaging bag. This helps address the problem that the electrode assembly 10 separates from the packaging bag during falling of the battery cell, and further resolves the resulting safety failures such as top seal being pushed open and short circuit.

The foregoing embodiments are merely intended to describe the technical solutions of this application, but not intended to constitute any limitation. Although this application is described in detail with reference to the foregoing preferred embodiments, persons of ordinary skill in the art should understand that modifications or equivalent replacements can be made to the technical solutions of this application, without departing from the spirit and scope of the technical solutions of this application.

What is claimed is:

1. A battery cell, comprising an electrode assembly and a packaging bag for accommodating the electrode assembly, wherein the battery cell further comprises:

a first adhesive layer and a second adhesive layer, wherein one end of the first adhesive layer and one end of the second adhesive layer are both adhered to a first surface of the electrode assembly, and the other end of the first adhesive layer and the other end of the second adhesive layer both extend to the bottom of the electrode assembly and are adhered to a second surface of the electrode assembly, the second surface being opposite to the first surface, wherein a surface on which a terminating end of the electrode assembly is located is defined as the first surface; and a third adhesive layer bonding the packaging bag and the electrode assembly together, wherein one end of the third adhesive layer is adhered to a surface of a part of the first adhesive layer located on the first surface, the surface of the part of the first adhesive layer facing away from the first surface, and the other end of the third adhesive layer is adhered to a surface of a part of the second adhesive layer located on the first surface, the surface of the part of the second adhesive layer facing away from the first surface, wherein, in a width direction of the electrode assembly, a spacing is provided between a first side of the one end of the third adhesive layer and an outermost side of the first adhesive layer facing away from the first side and/or another spacing is provided between a second side of the other end of the third adhesive layer and an outermost side of the second adhesive layer facing away from the second side, wherein the rest of the third adhesive layer between the one end and the other end of the third adhesive layer is directly bonded to the first surface.

2. The battery cell according to claim 1, wherein the first adhesive layer or the second adhesive layer is a single-sided adhesive, and the third adhesive layer is a double-sided adhesive.

3. The battery cell according to claim 1, wherein a width of the first adhesive layer or the second adhesive layer located on the first surface ranges from 10 mm to 20 mm.

4. The battery cell according to claim 1, wherein a difference between a length of the first adhesive layer or the second adhesive layer located on the first surface and a distance from the top of the third adhesive layer to the bottom of the electrode assembly is greater than or equal to 2 mm.

5. The battery cell according to claim 1, wherein a difference between a length of the electrode assembly and a length of the first adhesive layer or the second adhesive layer located on the first surface is greater than or equal to 10 mm.

6. The battery cell according to claim 1, wherein a width of the first adhesive layer or the second adhesive layer located on the second surface ranges from 10 mm to 20 mm.

7. The battery cell according to claim 1, wherein a length of the first adhesive layer or the second adhesive layer located on the second surface ranges from 10 mm to 40 mm.

8. The battery cell according to claim 1, wherein the spacing between the first side of the one end of the third adhesive layer and the outermost side of the first adhesive layer away from the first side is greater than 5 mm, or the another spacing between the second side of the other end of the third adhesive layer and the outermost side of the second adhesive layer away from the second side is greater than 5 mm, wherein the first side is opposite to the second side.

9. The battery cell according to claim 1, wherein bonding force between the first adhesive layer or the second adhesive layer and the electrode assembly is greater than that between the third adhesive layer and the first adhesive layer or the second adhesive layer.

10. A battery, comprising a housing and the battery cell according to claim 1, wherein the battery cell is accommodated in the housing.

11. The battery cell according to claim 1, wherein the third adhesive layer is attached to a middle of the first surface of the electrode assembly in the width direction of the electrode assembly.

\* \* \* \* \*